United States Patent [19]

Bailly et al.

[11] Patent Number: 4,567,329

[45] Date of Patent: Jan. 28, 1986

[54] LINE CIRCUIT FOR NETWORK JUNCTOR

[75] Inventors: François P. Bailly, Palaiseau; Alain Bourgoin, Dourdan; Renato Israel, Versailles, all of France

[73] Assignee: Societe Anonyme de Telecommunications, France

[21] Appl. No.: 609,976

[22] Filed: May 14, 1984

[30] Foreign Application Priority Data

May 18, 1983 [FR] France ................................ 83 08186

[51] Int. Cl.$^4$ ............................................. H04M 3/00
[52] U.S. Cl. .............................. 179/18 FA; 179/90 K; 179/16 EA
[58] Field of Search ............. 179/16 E, 16 EA, 90 K, 179/18 FA

[56] References Cited

U.S. PATENT DOCUMENTS

| | | | |
|---|---|---|---|
| 3,943,358 | 3/1976 | Reymond et al. | 250/199 |
| 3,973,084 | 8/1976 | Houland | 179/90 K |
| 4,008,379 | 2/1977 | Watkins | 179/90 K |
| 4,046,969 | 9/1977 | Dalley | 179/18 FA |
| 4,046,971 | 9/1977 | Losehand | 179/90 K |
| 4,151,377 | 4/1979 | Whitaker | 179/84 R |
| 4,375,014 | 2/1983 | Horak | 179/16 EA |

FOREIGN PATENT DOCUMENTS

| | | | |
|---|---|---|---|
| 0010720 | 5/1980 | European Pat. Off. | 179/18 |
| 2556157 | 6/1977 | Fed. Rep. of Germany | 179/18 |
| 2251975 | 6/1975 | France | 179/18 |
| 2244168 | 7/1975 | France | 179/18 |
| 2326100 | 4/1977 | France | 179/18 |

Primary Examiner—Gene Z. Rubinson
Assistant Examiner—Elio DiVito
Attorney, Agent, or Firm—Jacobs & Jacobs

[57] ABSTRACT

The present invention relates to a line circuit for network line junctor and more particularly to a dialling device. The dialling device according to the invention presents a high impedance for the direct current, the direct current being regulated about a predetermined threshold by means of an electronic choke, the regulation being controlled by a control circuit formed by an RC circuit with large time constant, by a diode and a capacitor. The invention is more particularly applicable to private switching equipment or to subscribers' terminals.

4 Claims, 3 Drawing Figures

4,567,329

LINE CIRCUIT FOR NETWORK JUNCTOR

BACKGROUND OF THE INVENTION

The present invention relates to a line circuit for network line junctor adapted to be inserted in private switching equipment or in subscribers' terminals.

A network line junctor is a device intended to link all the subscribers' lines of the same private autoswitch to a public telephone exchange by means of a two-wire network line. A network line junctor performs numerous functions, for instance transmitting the low frequency of the PTT line towards the link network of the private exchange or towards any other similar device (intercommunication set for example) and, vice versa, ensuring rejection of the common mode, ensuring good galvanic insulation of the PTT line with respect to earth, in particular.

These network line junctors comprise in particular a ringing detection device, a loop state control device, a dialling device.

The known dialling devices for network line junctor conventionally comprise an electromechanical relay introducing D.C. breaks in the loop in an appropriate number and at an appropriate frequency, said breaks then being detected by means of an electric circuit inserted on the public exchange side. Referring to FIG. 1, a conventional network line junctor or the prior art comprises a transformer 10 receiving the supply current from the public exchange and transmitting the low frequency to the private exchange 4.

Between the wires $R_A$ and $T_B$ of the network line, a capacitor 11 is generally disposed in series with a ringing detection circuit 13, connected by the normally closed contact 121 of the relay 12. The capacitor 11 makes it possible to couple the calling current device at rest and to protect the dialling relay 15. The work position of the contact 121 short-circuits the choke of the transformer 10 during dialling.

It was therefore usual, in order to limit the network line current, to insert a circuit 14 with three components placed in parallel: a capacitor 140, a resistor 142 and a thermistor 141. The latter thermistor 141 might be replaced by an assembly of contact-switchable resistors.

However, such dialling devices are not satisfactory due to a poor regulation of the D.C. supply. Relays are well known for their faults: bulky, noisy, expensive, and for their lack of reliability. The transformers is also very cumbersome as it must support the direct current.

French Pat. No. 2 251 975 in particular has already proposed a line circuit for line junctor comprising loop interrupting means particularly for dialling and comprising regulating means maintaining said loop current about a predetermined threshold, presenting a high impedance for the telephone frequencies and a low impedance for the ringing currents.

However, such a circuit limits the low frequency direct and alternating current, which is unfavorable. It does not operate in a sufficiently wide current-voltage range, and in particular at zero current. In addition, its functioning depends on a photothyristor which is a delicate component.

It is therefore an object of the present invention to improve such a circuit.

SUMMARY OF THE INVENTION

To this end, the present invention relates to a line circuit for a network junctor comprising loop interrupting means allowing dialling in particular, regulating means maintaining said loop current about a predetermined threshold, presenting a high impedance for the telephone frequencies and a low impedance for the ringing currents, characterized in that said regulating means comprise two transistors forming a Darlington assembly, the first transistor receiving on its base the loop opening or closure control pulse and being placed in series with a resistor, and means are provided for stabilizing the base voltage of said second transistor in order to raise the impedance of said regulating means in the telephone band.

Means for controlling said regulation preferably comprise a third transistor whose base is connected to the emitter of said first transistor and whose collector is connected to the base of said second transistor, its emitter being connected to said resistor via a diode in order to improve the regulation for the low voltages.

Between the base of said third transistor and the emitter of said first transistor, there is advantageously interposed a low pass filter with a large time constant, which limits the regulation for the ringing currents.

Moreover, a Zener diode is disposed between the base of said second transistor and said resistor in order to limit the excess voltages in open loop.

The device of the invention may support any defective conditions likely to occur on the line. For example, currents may be induced by the A.C. network and transitory currents at high voltage (400 V). Moreover, the network line junctor of the invention presents, on the subscriber side, a high line current supply impedance in the whole frequency band 300–3400 Hz used for the telephone channels.

BRIEF DESCRIPTION OF THE DRAWINGS

The invention will be more readily understood on reading the following description with reference to the accompanying drawings, in which.

DETAILED DESCRIPTION OF A PREFERRED EMBODIMENT OF THE INVENTION

Figure 1:
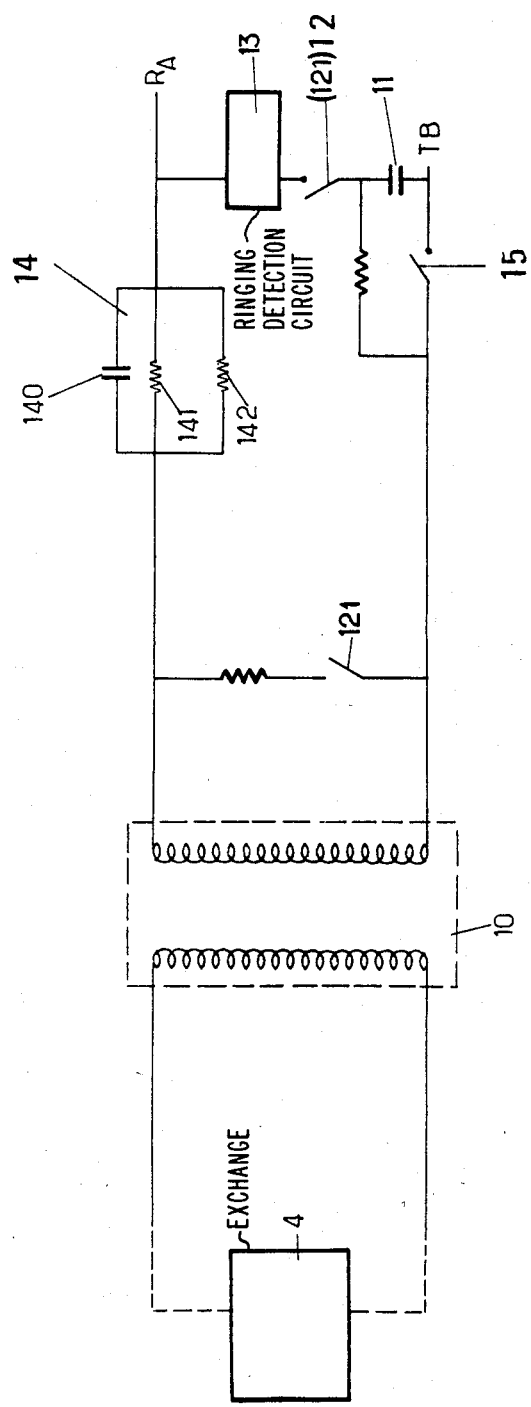
FIG. 1 shows a conventional junctor of the prior art.
Figure 2:
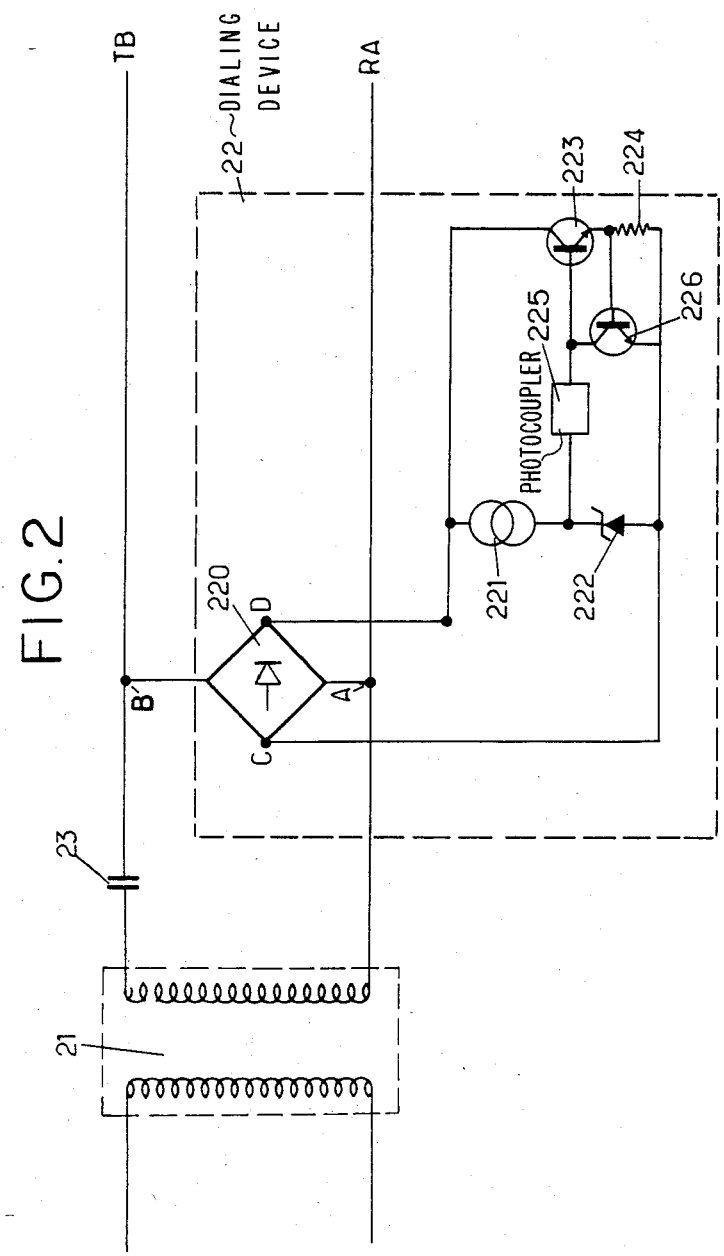
FIG. 2 shows a first embodiment of the network line junctor of the invention.

Referring now to FIG. 2, a transformer 21 ensures two-wire/four-wire transformation. A dialling device 22 is placed between the two wires $T_B$, $R_A$ of the network line. Between point B of wire $T_B$ and the transformer 21 is placed a capacitor 23 which protects the transformer from the direct current.

The dialling device 22 is composed as follows: between points C and D of a diode bridge 220 mounted between point B and a point A of the wire $R_A$, C and D being placed on the other diagonal than points A and B, a current source 221 and a Zener diode 222 are placed in series. The Zener diode 222 is conductive in direction C towards D. In parallel on elements 221 and 222, a transistor 223 of npn type is placed in series with a resistor 224. The emitter of transistor 223 is connected to resistor 224 whilst its base is connected to a photocoupler 225. The other terminal of the photocoupler 225 is connected to the common terminal of the current source 221 and of the Zener diode 222. This photocoupler 225 may be replaced by any other switch, as shown schematically in FIG. 2.

The base of the transistor 223 is also connected to the collector of another transistor 226 of pnp type whose emitter is connected to the common terminal of the resistor 224 and of the Zener diode 222. The base of this transistor 226 is connected to the emitter of the transistor 223.

When a loop current circulates from B to A, or from C to D, the transistor 223 becomes conductive when the photocoupler 225 has taken its base to a sufficient potential. This photocoupler performs the function of dialling by controlling the interruptions of the loop current.

The impedance presented by such a circuit is sufficiently high in the telephone band. In fact, the impedance presented by this circuit rises to the impedance of the parallel current source 221 and to the impedance of the transistor 223 regulated by the transistor 226. In this way, when the photocoupler 225 is in open position, the leakage current is the sum of the leakage current passing through the Zener diode 222 and of the leakage current passing through the transistor 223.

Figure 3:
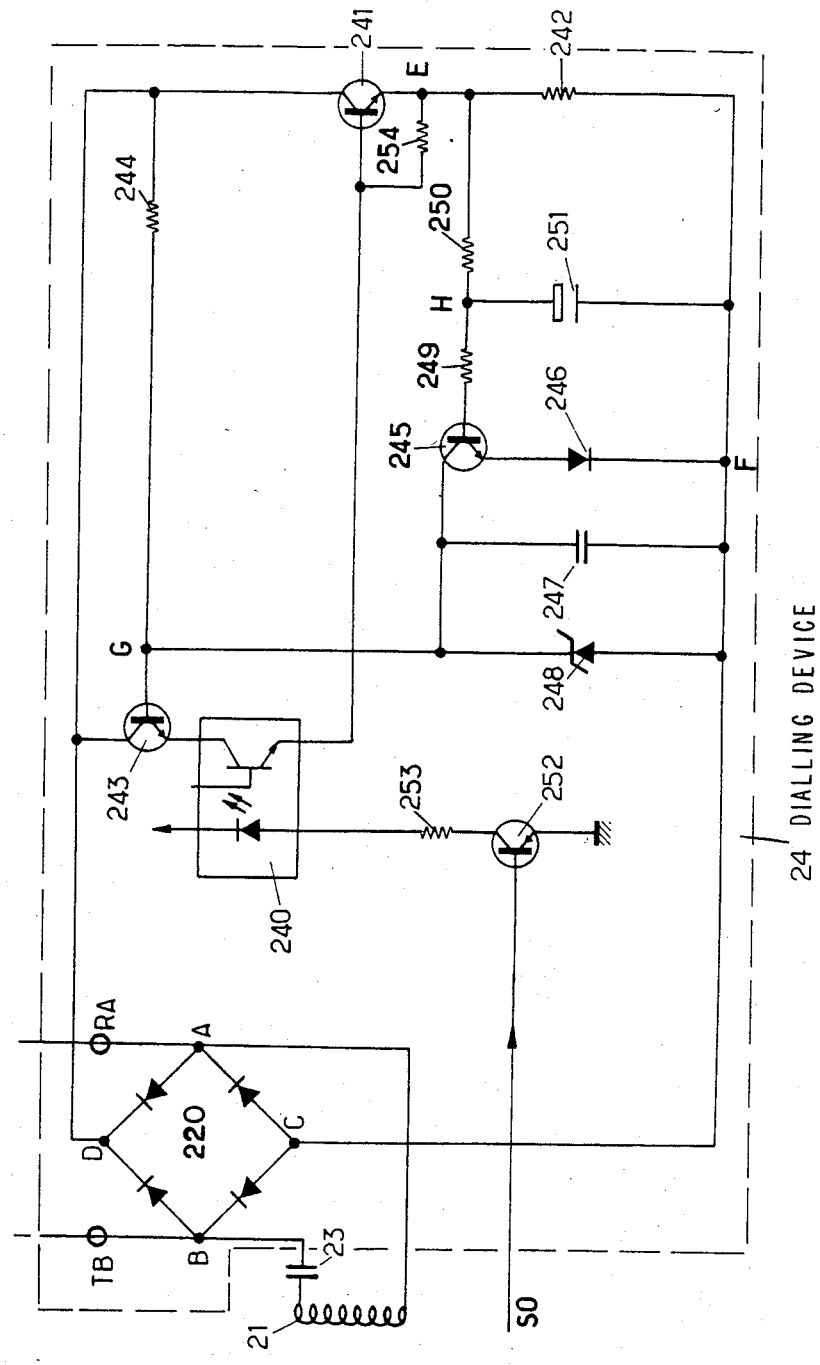
FIG. 3 shows a second, preferred embodiment of the junctor of the invention.

FIG. 3 shows the preferred embodiment of the junctor of the invention. In the same way as in FIG. 2, a dialling device 24 is inserted between wires $T_B$ and $R_A$ via a diode bridge 220; this bridge makes it possible to have a fixed polarity at the terminals of the regulator whatever the polarity of the line.

Similarly, a capacitor 23 makes it possible to protect the transformer 21 from the direct current. The dialling device 24 also comprises a photocoupler 240 connected to the base of a transistor 241. The transistor 241 of npn type is connected to a resistor 242 by its emitter at a point E whilst its collector is connected to the collector of another transistor 243, thus forming a Darlington assembly.

The emitter of transistor 243 also of npn type is connected to the other terminal of the photocoupler 240. The base of transistor 243 is connected at a point G, on the one hand, to the collector of transistor 241 via a resistor 244, on the other hand, to the collector of another transistor 245 likewise of npn type.

The emitter of transistor 245 is connected to a point F via a diode 246. This diode 246 is conductive from G towards F. Point F is a terminal of the resistor 242, other than point E. A resistor 254 is placed between the base of the transistor 241 and its emitter. Between G and F are placed, in parallel on the transistor 245 and the diode 246, on the one hand, a capacitor 247 and, on the other hand, a Zener diode 248. Moreover, the base of the transistor 245 is connected to point E via two resistors 249 and 250 forming an RC circuit with a capacitor 251. The terminal H common to the two resistors 249 and 250 is connected to point F via the capacitor 251.

The loop opening and closure control signal SO is applied on the base of a transistor 252 of pnp type whose collector is connected to the photocoupler 240 via a resistor 253.

The loop current is controlled by signal SO which passes a current in the photodiode of photocoupler 240. This photocoupler 240 applies a current or cuts off the base current of the transistor 241 corresponding to the establishment or cut-off of the loop during dialling on the line. The photocoupler 240 may be replaced by any equivalent interrupting means.

Transistor 241, resistor 242 as well as transistor 243 forming a Darlington assembly with the first, form a current regulator. In this way, upon loop closure, the voltage at the terminals of the resistor 242 controls the transistor 245 which itself controls transistor 243. Transistor 243 furnishes the base current to the transistor 241. In this way, if the voltage at the terminals of the resistor 242 increases, the transistor 245 will be more conductive and transistor 243 will be less conductive, which reduces the base current of the transistor 241 bringing about a decrease in the collector current. The lowering of the current passing through the transistor 241 will lower the voltage at the terminals of the resistor 242. In this way, the current regulation effected by the three transistors and the resistor, forming what may be called an electronic choke, makes it possible to conserve a loop current close to a suitably chosen threshold.

In practice, it is desired that the current circulating on line be between 29 mA (by 7, 25 V at the terminals of the junctor) and 40 mA (by 36 V at the terminals of the junctor). A capacitor is chosen for the capacitor 247 of the order of 0.68) $\mu F$ in order to stabilize the voltage on the base of the transistor 243, which raises the impedance of the regulator thus formed in the telephone band. Moreover, a diode 246 will be chosen in the collector circuit of the transistor 245 so that it improves the regulation.

Finally, a low-pass filter made by an R-C circuit formed by resistors 249, 250 and by capcitor 251, presents a large time limiting the regulation for the ringing currents, which increases the direct and alternating current during the ringing. Such a feature is very advantageous as it allows a sudden saturation of the circuit which is easily translated on a timing chart by peaks during closure of the loop. Moreover, the resistor 254 makes it possible to reduce the leakage current. As to the Zener diode 248, it protects transistor 245, capacitor 247 and even photocoupler 240 against the excess voltages when the loop is open.

If SO is the control signal varying from +5 V to −5 V formed by logic levels "1" (−5 V), when a line is taken (for incoming or outgoing communication), the transistor 252 is saturated, which activates the phototransistor 240 and provokes closure of the loop. The transistor 241 is saturated very violently, which provokes current peaks upon establishment of the loop. These peaks are very advantageous as they may be picked up, even in long line, at the most conventional public exchanges, for example by triggering off relays. Such a feature of the device of the invention is due in particular to the presence of the capacitor 247 which discharges upon establishment of the loop. The capacity of capacitor 247 prevents the potential of the base of transistor 243 from varying likewise at its emitter potential, which gives the regulator a high impedance at telephone frequencies. This feature of peaks is also obtained thanks to the RC circuit, of suitably chosen time constant, which produces a delay of the stabilization of the direct current.

The loop current regulator which has just been described presents an infinite impedance for the direct current, a high impedance for the audio frequency currents so that the impedance of the line depends essentially on the translator and on its auxiliary circuits (about 600Ω to 800 Hz). On the other hand, the impedance of the junctor at 25 Hz and 50 Hz is low enough for the direct current superposed on the ringing current, during ringing, when a line is taken, to be sufficient to allow detection, at the public exchange, of the loop closure.

In the present invention, each transistor may be replaced by any equivalent means.

The device according to the invention is applicable both to two-wire/four-wire junctors and to two-wire junctors.

What is claimed is:

1. A line circuit for network junctor, comprising loop current interrupting means allowing dialling including regulating means for maintaining said loop current about a predetermined threshold and for presenting a high impedance for the telephone frequencies and a low impedance for the ringing currents, said regulating means comprising two transistors forming a Darlington assembly, the first transistor receiving on its base a loop opening or closure control pulse and being in series with a first resistor, the base of the second transistor and the collector of the first transistor being connected by a second resistor, and means for stabilizing the base voltage of said second transistor in order to raise the impedance of said regulating means in the telephone band, means for controlling said regulating means disposed in parallel on said first resistor and comprising a third transistor whose base is connected to the emitter of said first transistor and whose collector is connected to the base of said second transistor, the emitter of said third transistor being connected to said first resistor via a diode in order to improve the regulation for the low voltages.

2. The circuit of claim 1, wherein said stabilization means comprise a capacitor.

3. The circuit of claim 1, wherein a low pass filter is interposed between the base of said third transistor and the emitter of said first transistor, said low pass filter having a large time constant and being operable to limit the regulation for the ringing currents.

4. The circuit of claim 1, wherein a Zener diode is disposed between the base of said second transistor and said first resistor in order to limit the excess voltages in open loop.

* * * * *